April 28, 1942.   H. H. McKEE   2,281,449
HAM BUTCHERING
Filed March 1, 1940

ATTEST-

Harry H. McKee
INVENTOR
BY
ATTORNEY

Patented Apr. 28, 1942

2,281,449

UNITED STATES PATENT OFFICE 2,281,449

HAM BUTCHERING

Harry H. McKee, Chicago, Ill., assignor to Industrial Patents Corporation, Chicago, Ill., a corporation of Delaware Application March 1, 1940, Serial No. 321,674

4 Claims. (Cl. 17—45)

This invention relates to the butchering of animal carcasses.

One of the objects of the invention is to provide a method of improving the conformation and texture of ham.

Another object of the invention is to increase the ratio of meat to bone in the ham.

Other objects of the invention will be apparent from the description and claims which follow.

In the preparation of pork for market, the hog is cleaned and eviscerated immediately after killing, and then chilled for twenty-four to forty-eight hours in order to make the flesh firm enough to handle. Ordinarily, before chilling, the heads are removed, the carcass suspended by the cords in the heels of the hind legs, and the carcass split down the spine, except for a small portion of flesh at the hip. After chilling, the carcass is cut into the usual wholesale portions, such as hams, loins, bellies, etc. During the chilling process the entire weight of the hog is supported by the bones and muscles of the hind legs. This results in considerable tension in the muscles of the ham during chilling, tending to make it elongated and skinny, which shape it retains after cutting and throughout processing.

Ordinarily the shank end of the ham is much less desirable than the remainder because of the small proportion of flesh in this section. It has been found that if the tension ordinarily present in the mucles of the ham during chilling is released by severing the skin, flesh and tendons at the extremity of the fibular tarsal bone, sometimes called the calcis or heel-bone, the appearance and texture of the ham are greatly improved.

The preferred method of practicing the present invention will be understood by reference to the drawing in which like reference characters indicate similar elements in their respective figures.

Figures 1, 2:
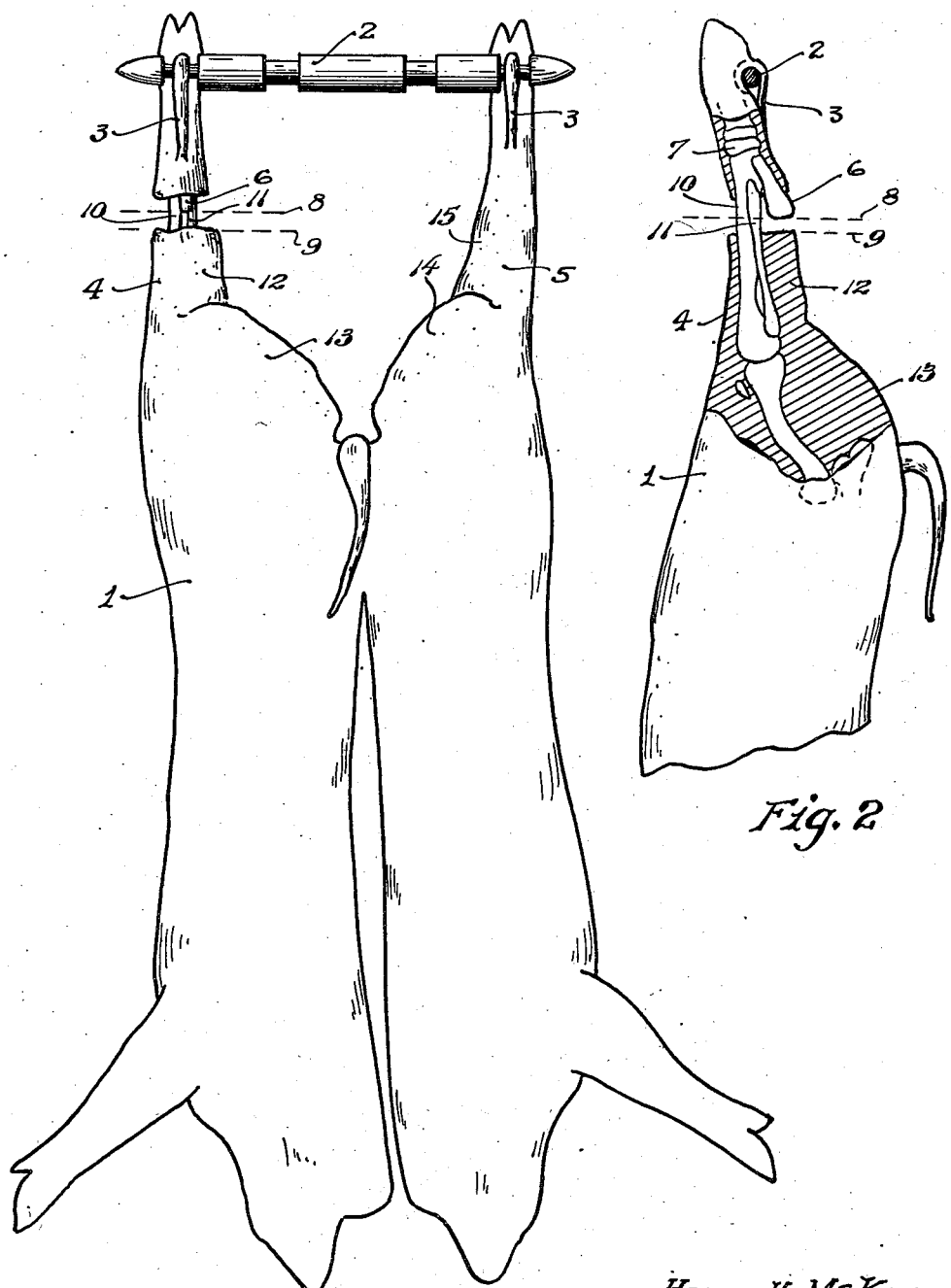
Figure 1 is a rear view of a hog carcass, the left side showing the hind leg butchered in accordance with the present invention, the right side showing the usual method of handling.
Figure 2 is a side view partly in section of a carcass butchered in accordance with the present invention.

A hog carcass 1 is preferably suspended on suspension means 2 inserted under the cords 3 at the heel of the hind legs 4 and 5. The carcass is cleaned, eviscerated, deheaded and the vertebrae of the spine split as in the usual practice. Prior to removal to the chilling chamber, and while the carcass is still warm, the skin, muscles and tendons of the hind leg are severed above the lower leg joint 7 and at a point at about the extremity of the fibular tarsal bone 6 as shown in Figure 2. The preferred line of severance is indicated on hind leg 4 by the broken line 8. Upon severing the flesh and tendons at this point, the tension is removed from the muscles of the hind leg, allowing them to sag and relax, dropping away from the point of severance 8 as indicated by the dotted line 9. The carcass is then sustained by the two shank bones, namely the large bone 10, known as the tibia and the small bone 11, known as the fibula. As a result of this treatment, the meat of the shank portion 12 of the ham 13 has assumed a lower position on the shank bone, thereby making the shank portion and also the remainder of ham plumper and the ratio of meat to bone in the entire ham larger than in ham 14 of a carcass handled by the conventional method. The latter is illustrated by the shank portion 15 of hind leg 5.

The improvement of the present invention is of particular importance to the retail butcher, as a ham taken from a carcass handled as disclosed in the present invention yields larger and more desirable center slices than a ham taken from a carcass handled in the ordinary manner. Also the shank portion of the ham is less wasteful and more economical to the consumer. It has also been found that hams taken from carcasses butchered in accordance with the present invention have an improved texture, in that the meat is more tender than that of a ham taken from a carcass in which the muscles and cords of the heel or lower leg are not severed prior to chilling.

After the severance of the muscles and tendons at approximately the extremity or tip of the fibular tarsal bone, the carcass is chilled and handled in the ordinary manner including severing the shank bone at a point preferably about even with the flesh of the bone and severing the ham from the remainder of the carcass. After chilling, the muscles of the ham retain their new position throughout their processing so that the improved conformation is retained in these products.

Obviously many modifications and variations of the invention hereinbefore set forth may be made without departing from the spirit and scope thereof, and therefore only such limitations should be imposed as are indicated in the appended claims.

I claim:

1. The method of manufacturing hams from freshly dressed edible animal carcasses which comprises severing the tendons of the hind leg above the lower leg joint and at approximately the end of the fibular tarsal bone, suspending the carcass by the bones of the hind leg whereby the ham assumes a relaxed position and cooling the carcass while so suspended.

2. The method of manufacturing hams from hog carcasses and sides thereof which comprises suspending a freshly dressed carcass from the hind legs, cutting the skin, meat and tendons of the hind legs at approximately the upper extremity of the fibular tarsal bones whereby the carcass becomes sustained by the bones of the hind legs and chilling the carcass while so suspended.

3. The method of manufacturing hams from hog carcasses and sides thereof which comprises suspending a freshly dressed carcass by the hind legs, severing the tendons of the hind legs near the upper end of the fibular tarsal bone whereby the hams assume a relaxed position, cooling the carcass while so suspended, and thereafter separating the hams from the remainder of the carcass.

4. The method of manufacturing hams from freshly dressed animal carcasses and sides thereof which comprises suspending the carcass by the hind legs, severing the skin, meat and tendons at approximately the upper extremity of the fibular tarsal bones, chilling the carcass while suspended by the bones of the hind legs, thereafter cutting the bones at approximately the point of said severance and separating the hams from the body of the carcass.

HARRY H. McKEE.